United States Patent [19]

Letemps et al.

[11] Patent Number: 4,813,993
[45] Date of Patent: Mar. 21, 1989

[54] DEVICE FOR FORMING GLASS

[75] Inventors: Bernard Letemps; Jean-Mark Petitcollin, both of Thourotte; Francis Perin, Sauvigny les Bois; Herve Prouveur, Liev-Saint; Jean Lissillour, Paris, all of France

[73] Assignee: Saint-Gobain Vitrage, Courbevoie, France

[21] Appl. No.: 33,797

[22] Filed: Apr. 3, 1987

[30] Foreign Application Priority Data

Apr. 8, 1986 [FR] France ................................ 86 04962

[51] Int. Cl.$^4$ .......................................... C03B 23/023
[52] U.S. Cl. ........................................ 65/273; 65/106; 65/287
[58] Field of Search ................. 65/104, 107, 106, 273, 65/287

[56] References Cited

U.S. PATENT DOCUMENTS 4,615,724  10/1986  Fackelman .................... 65/106 X
4,682,997   7/1987  Halberschmidt et al. ............ 65/104

Primary Examiner—Arthur Kellogg
Attorney, Agent, or Firm—Oblon, Fisher, Spivak, McClelland & Maier

[57] ABSTRACT

A device for forming glass sheets for using the forming process according to which the glass sheets are brought horizontally into a heating furnace then are brought to a forming station where they are transferred individually and vertically to an upper mold exhibiting a radius of curvature less than or equal to the one it is desired to impart to the glass, then are applied against the upper mold by a suction due to a low pressure created on their periphery and in the vicinity of their periphery. The device essentially comprises a suction box in which is placed an upper mold with dimensions slightly less than those of the glass sheet to be shaped and whose lower face, against which the glass sheet is applied, is located on the outside of said suction box.

9 Claims, 3 Drawing Sheets

DEVICE FOR FORMING GLASS

BACKGROUND OF THE INVENTION

1. Field of the Invention

This invention relates to an improvement in the techniques of forming flat glass and more precisely of those techniques according to which the glass sheets are shaped by application against a bending mold with forces of a pneumatic nature.

2. Background of the Prior Art

Numerous processes are known of forming a glass sheet according to which the glass sheet is loaded in horizontal position into a reheating furnace intended to bring its temperature to above 500°-600° C., in which it is conveyed on a conveyor such as a roller bed which extends downstream to a bending station. In this latter the sheet is taken over by a mobile transfer device at least in a vertical direction, then placed on a recovery frame which then brings it to the tempering station or to any other cooling station.

Depending on the case, the forming takes place either at the time and after the placing of the glass sheet on the recovery frame which then advantageously consists of an open ring whose contour corresponds to the contour it is desired to impart to the glass sheet, the bending then being performed under the effect of the forces of gravity and inertia, or at the time of taking over of the glass sheet by the transfer element which then comprises an upper bending mold whose curvature corresponds to that of the shaped glass sheet, or also by a combination of the two cases cited above.

The forming processes by application of the glass sheet against the upper bending mold are particularly advantageous, because they allow a better control of the deformation of the glass in its central part, while perfectly meeting the shape desired for the glass contour.

Such a process is described in the publication of French patent FR No. 2 085 464. According to this document, the glass sheet is conveyed into a reheating furnace, in horizontal position, by a conveyor of the roller bed type which extends downstream from the furnace to a bending station. There the glass sheet is immobilized then transferred vertically by a suction due to a low pressure created around the periphery of the sheet, to a curved, nonperforated upper bending mold against which it is applied to be shaped, according to the desired main curvature. The low pressure is obtained by placing the upper bending mold in a box without bottom or skirt, connected to suction means, and whose inside contour is slightly greater than that of the glass sheet while the contour of the upper bending mold is slightly smaller than the latter. Optionally, a complementary curvature is then given to the glass, for example, by pressing.

The main drawback of this type of device comes from the fact that the dimensions and geometry of the upper mold and of the bottomless box are rigorously controlled by those of the glass sheet itself. This means that any modification relating to the glass sheet involves the necessity of simultaneously replacing the box and the upper bending mold.

This replacement must also be performed frequently if the glazings are at least partially enameled. In this case, the enamel at times has a tendency to stick to the covering of the upper bending mold, a covering of refractory paper or fabric glued to the mold with refractory cement. The enamel then causes a rapid deterioration of this covering and the upper mold has to be withdrawn from the bending station, allowed to cool, and a new covering glued in before being able to use it again.

Another limit of this process comes from the fact that to shape glass sheets in a small radius of curvature, considerable suction powers are necessary, the distance between the upper bending mold and the box then being increased because of the curvature of the mold. In practice, this limits the curvatures that can be obtained with this type of forming.

Further, to obtain a sufficient power of suction of the glass sheets, it is necessary that the free space left between the sheet and the side walls of the box remain small. Also, with the slightest offset of the stop position of the glass, the latter hits the side walls of the box at the time of its movement and it must then be rejected.

SUMMARY OF THE INVENTION

This invention processs to improve the technique developed above to reduce its drawbacks, while retaining its advantages.

According to the invention and according to the teaching of the publication of the patent FR No. 2 085 464, the glass sheet is lifted and flattened against an upper bending mold by a low pressure which is exerted on the periphery and in the vicinity of the periphery of the glass sheet. However, and this constitutes an essential difference between this invention and patent FR No. 2 085 464, the lower face of the upper bending mold is placed at least in part on the outside of the low pressure box. In other words, for using the forming process, according to which the glass sheets are brought horizontally into a heating furnace then brought to a bending station where they are transferred individually and vertically to an upper bending mold, the application against the upper mold being obtained by suction due to a low pressure created on the periphery and in the vicinity of the periphery of the glass sheet, according to the invention a device is proposed comprising a low pressure box in which is placed an upper bending mold of dimensions less than that of the glass sheet to be shaped and whose upper face, against which the glass sheet is applied, is located on the outside of the low pressure box, i.e., the lower limit of the side walls of the box is located above the lower limit of the bending mold.

This step taken in regard to the upper mold has the first effect that the glass sheet penetrates the inside of the low pressure box only at the end of flattening, i.e., when it is already shaped in its main curvature and occupies a smaller surface. This naturally causes greater lateral leaks and the need for a greater suction force. However, it appeared that this step appearing minor and rather unfavorable made possible a number of particularly advantageous developments of the invention.

First, there is a direct advantage, as even in the case of a poor centering of the glass sheet in relation to the upper mold, the edges of the sheet will no longer come in contact with the walls of the low pressure box, causing an irreparable marking of the glass.

This freedom of positioning of the sheet relative to the upper mold and especially to the suction box opens up a great number of choices in the relative dimensions of the sheet, the mold and the box.

Thus, when the pieces differ in regard to their dimensions and especially their curvature after forming, the change of the upper mold can be performed without simultaneous replacement of the low pressure box because the upper mold is located according to the invention on the outside (below) of the low pressure box.

This step is more particularly advantageous if, according to a particularly preferred embodiment of the invention, the upper bending mold is made of a light material, for example, of refractory steel which greatly facilitates its handling. Further, with the upper mold advantageously not being mounted solid with the low pressure box, the sole replacement of the upper mold as a function of the dimensions of the glazing is possible on the inside of the heated forming enclosure, with a minimum of caloric losses and in a particularly short time.

Besides reduction of the contacts between the glass and the side walls of the box, it is possible to eliminate practically all contact between the upper bending mold and the piece of glass. This is particularly the case if an upper bending mold is used, equipped with spacing pins on which the glass sheet rests.

According to another preferred embodiment, by way of avoiding absolutely any contact and friction between the glass and the upper bending mold, the upper mold is connected to a hot air intake device, optionally under pressure. Thus a protective air cushion is formed between the upper mold and glass sheet.

Of course, this latter solution is a little more delicate to use than the preceding ones, but it makes possible the treatment, by a single suction mold, of successive glazings not exhibiting, for example, common free surfaces or whose enameled part is located particularly in the central part. Further, the absence of any contact assures a perfect optical quality and this air cushion device can advantageously be used each time such an optical quality is sought.

A preferred embodiment of the invention facilitates the obtaining of forms of glazings that are hard to obtain, requiring a complementary forming after the forming by application against the upper mold. According to this particularly advantageous use, the box is surrounded by a concentric skirt mobile in a vertical direction. This concentric skirt is such that immediately after the take-off of the glass sheet, it determines a temporary box which has dimensions slightly greater than the glass sheet; thus the mobility of the skirt makes it possible easily to introduce a pressing mold in the forming unit and further to reduce the necessary suction power.

BRIEF DESCRIPTION OF THE INVENTION

Other advantages and characteristics of the invention will come out in a more detailed manner in the following description, given with reference to the accompanying drawings which represent:

FIG. 1: A diagrammatic view of a forming unit using a forming device according to an embodiment of the invention, FIG. 2: A diagrammatic view in longitudinal section of a forming unit, namely a suction box and a mold, made according to the teaching of patent FR No. 2 085 464, FIG. 3: A longitudinal section of a forming unit according to an embodiment of the invention, FIG. 4: A longitudinal section of a forming unit with a hot air cushion between the mold and glass sheet, FIG. 5: A longitudinal section of a forming device comprising a box and a mobile concentric skirt.

DETAILED DESCRIPTION OF THE INVENTION

Figure 1:
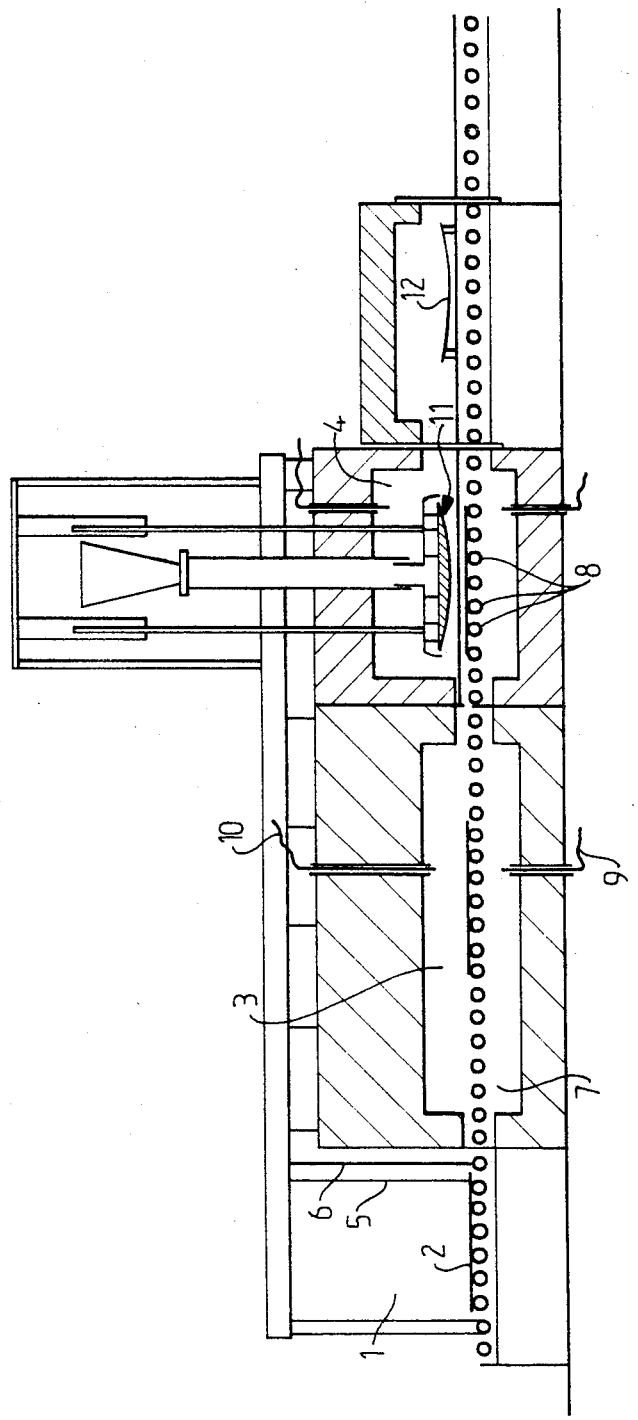

The forming unit represented in FIG. 1 comprises successively a loading section 1 for glass sheets 2, a glass reheating furnace 3 and a glass forming cell 4.

Furnace 3, whose opening is closed by a series of flexible curtains 5,6 intended to avoid thermal shocks in the furnace at the time of loading the glass, is passed through by a conveyor 7 formed, for example, by a roller bed 8 of vitreous silica sheathed by refractory fabric. This furnace, of the tunnel type, comprises two series 9, 10 of resistors which face each other, placed on both sides of the conveyor and whose temperatures vary as a function of the longitudinal and crosswise position in the furnace to control heating of the glass very precisely. Such a furnace allows a very good control of the heating of the glass to a temperature allowing their forming, generally on the order of 630°–650° C.

Downstream from the furnace, the glass sheet goes into forming unit 4 itself, its arrival being picked up by optical detectors, of the photoelectric type, optionally combined with mechanical detectors, moved by the glass sheet. Such mechanical detectors are, for example, described in French patent application No. 85.13801. Detection of the glass makes it possible to control the simultaneous stopping of the driving of the conveyor rollers located under the forming device. At this time, the glass sheet is lifted under the effect of a powerful suction and is flattened against upper bending mold 11 whose curvature it then assumes. The unit, consisting of the glass sheet and the upper bending mold, and the elements making it possible to create the suction, is then raised to leave sufficient room for the introduction of a glass recovery carriage 12. The formed sheet is finally deposited on said carriage which takes it, thanks to rails placed on both sides of the conveyor, to a subsequent glass treatment cell.

The following description examines in more detail the characteristics of the forming cell itself.

As already mentioned, the main forming device consists essentially of a box without bottom or skirt and a bending mold. A device of the type described in the patent FR No. 2 085 464 has been represented in FIG. 2 to better highlight the differences between the invention which is the object of this application, and the prior art.

Figure 2:
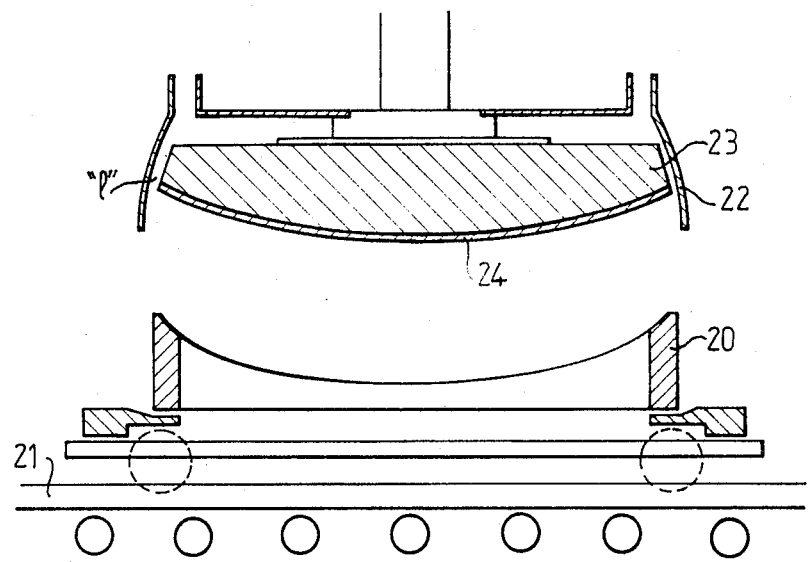

In FIG. 2, according to the teaching of said patent FR No. 2 085 464, a bottomless box 22 forms a "skirt" around a mold 23. The box has the same geometric shape as a glass sheet 24 but slightly larger dimensions. Since, on the other hand, bending mold 23 has dimensions slightly less than those of glass sheet 24, a peripheral space remains between the sheet and the bottomless box by which a lateral leak "1" is made which makes it possible to create a low pressure which flattens the glass sheet against mold 23, whose shape it assumes before being recovered by the carriage moved on rails 21. Any change in the dimensions of the glass sheet imposes a modification of the mold and box and, on the other hand, any error in centering the glass sheets leads to a marking of the sheet which has struck the side walls of the low pressure box.

Figure 3:
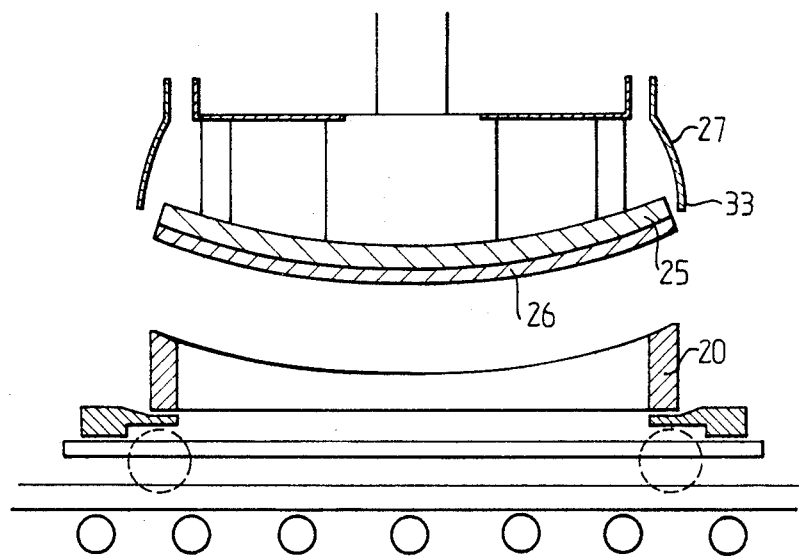

Such drawbacks, on the other hand, are considerably reduced if use is made of an upper bending mold according to the main teaching of the invention and as illustrated by FIG. 3. Actually, advantageously, upper mold here referenced 25 is placed so that glass sheet 26 cannot go into the bottomless box referenced 27, the upper bending mold being placed at a level lower than that of the lower limit of the side walls of the box.

In this way, the deviations in centering of the glass sheets can no longer cause their marking. Further, the upper bending mold is more accessible, especially if in addition it is made of a material that is relatively light but resistant to deformation at the working temperatures necessary here, such as a refractory steel. Besides less weight, a refractory steel further exhibits in relation to the refractory cements recommended by the patent FR No. 2 085 464 the advantage of a great thermal conductivity and therefore a greater rapidity in heating and cooling, a characteristic useful at the times of interruption of the operation of the forming unit for the changes of upper bending molds and in start up. Further, the suction box can then be made in two independent parts, the skirt itself and a suction chamber, parts then provided with dismantling means. Also preferably, the skirt of the suction box is provided with two pins 33, of metal or teflon for example, on which the front edge of the glass sheet strikes which is thus repositioned correctly along the axis of the conveyor.

The need to change the upper bending molds is often due to the degradation of the refractory paper or fabric used to soften the contact between the glass and the bending mold. To reduce the frequency of c.hanges, the device of FIG. 3 can further receive various improvements. First, the upper sheet can be provided with a series of spacing pins against which the glass sheet comes to rest. If the latter is partly enameled, these pins are advantageously placed so that no contact is made between the pins and the enamel, which simultaneously limits the risks of abrasion of the enamel itself and the deterioration of the surface at the upper bending mold, which receives the glass, caused by contact with the enamel of the glass. The invention thus limits the risks of abrasion of the enamel and, on the one hand, eliminates the interruptions due to replacement of the refractory paper or fabric generally used.

In a further preferred embodiment, the spacing pins are eliminated and are replaced by a hot air cushion, this latter solution being preferable from the viewpoint of optical quality. In this way, any contact between the glass and upper bending mold is prevented which is particulary advantageous for forming of glass sheets exhibiting an enameled decor on all of one face or at least in its central part.

Figure 4:
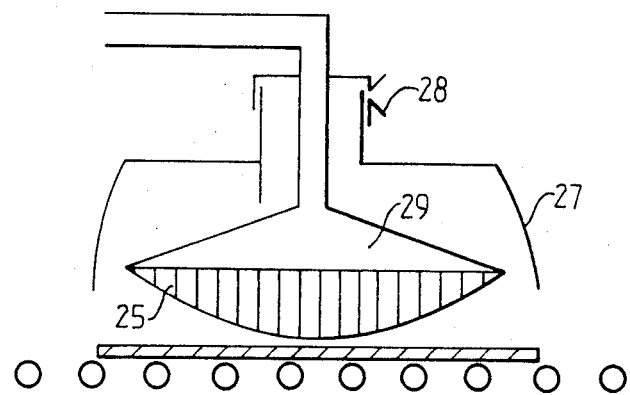

This embodiment is shown in FIG. 4. Its principle consists in isolating upper bending mold 25 from suction box 27 put under low pressure with the aid of an aspirator 28 putting under relative pressure a chamber 29 located above upper bending mold 25 and in communication with the lower face of the latter. Thus, in this case the mold being pierced, for example, by a series of microperforations (not shown), an air cushion opposes the contact between glass 26 and upper bending mold 25. Chamber 29 under pressure, depending on the case, can be fed with the aid of a compressor or quite simply be connected to a duct 30 coming out on the outside of box 27 in the forming cell, the low pressure created, moreover, for suction of the glass sheet being sufficient then to create an intake of gas and the pressure necessary for forming the air cushion.

In this case, there is thus no reason for friction between the upper mold and the glass sheet, and the refractory paper or fabric used to improve the state of the contact surface can optionally be eliminated. Further, the two faces of the glass are then placed under the same temperature conditions and a better optical quality probably due to a better thermal homogeneity is thereby found.

The upper bending mold is curved at least longitudinally and its camber is equal to that of the main curvature which it is desired to give to the glass after bending, which therefore corresponds to a forming of the glass essentially by flattening against a mold. However, in particular cases, it is found experimentally that the glass exhibits characteristics requiring overcurving of this upper mold to obtain in the end the desired main curvature.

If use is not made of solid glass recovery carriages but carriages open in their center, a spherical bending of the central part of the glazing then not supported occurs. To remedy this and to obtain a cylindrically shaped glass sheet, it is possible according to an advantageous characteristic of the invention to give to the upper bending mold a crosswise countercurving by giving it, in the direction perpendicular to the main bending direction, a negative chamber which the forces of gravity compensate for at the time of placing the softened glazing on frame 20.

The above-described embodiments of the invention are well suited for obtaining bent glazings with a large radius of curvature. To obtain glazings with a small radius of curvature or complex curvature, particularly multiple radii of curvature, the main bending, assured by application against the upper mold, should be completed by a complementary bending operation, preferably by pressing, although other usual forming means can also be used. For this purpose, it is necessary to introduce under the upper bending mold a pressing mold, or any other equipment for complementary forming of the glass, an operation made delicate by the presence of the skirt.

Figure 5:
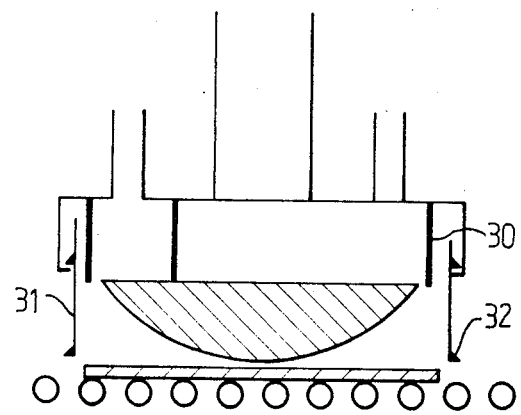

If the equipment used is too bulky—which is the case, for example, if it is desired to use standard equipment whose dimensions are greater than those of the suction box—it is then preferable to use the embodiment of the invention illustrated, in FIG. 5, according to which skirt 30 is of very small dimensions and is vertically doubled by mobile walls 31. In the low position, these walls reach a level very slightly greater than that of the glass on the conveyor. The low pressure thus produced is right at the periphery of the glass which facilitates the lifting of the sheet. The mobility in height of the walls makes it possible to raise them at the time of introduction of the pressing mold, without having to raise to too great a height the upper bending mold. Walls 31 carry at their lower end pads 32 which rest against the edges of the pressing mold at the time of recovery of the sheet and during the pressing operation if the upper mold is also used as a pressing countermold. Thus, it is seen that the device according to the invention makes it possible to proceed in a very simple way to complementary formings by pressing, essential when the desired shape is complex. Further, thanks to the presence of this additional box formed by mobile walls 31, the suction is always channeled and lateral leaks are minimized.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for bending a heated glass pane, comprising:
   a heating furnace,
   means for conducting said pane from said furnace to a molding station, said molding station comprising:
   an upper bending mold having a lower curved surface against which said pane is applied by reason of a suction created around the periphery of said pane, which pane at all points extends beyond the periphery of said lower curved surface,
   suction means for creating said suction comprising a bottomless suction box, said upper bending mold being located with respect to said suction box such that said lower curved surface is outside said suction box throughout normal operation of the apparatus,
   said suction box being of a dimension such that its lower opening is larger than the upper bending mold, whereby the periphery of glass panes applied against said lower curved surface may extend into the space between said bending mold and said suction box.

2. Device according to claim 1, wherein the lower curved surface exhibits a longitudinal curvature equal to or greater than the main curvature which it is desired to impart to the glass sheet.

3. Device according to claim 2, wherein the lower curved surface exhibits a crosswise countercurve.

4. Device according to claim 1, wherein the periphery of said suction box is of dimensions less than that of the treated glass sheet.

5. A device according to claim 1, wherein the suction box is comprised by vertically mobile side walls which may double in length.

6. Device according to claim 5, wherein said mobile walls comprise, at their lower end, support pads resting on the corresponding pads of a female press.

7. Device according to claim 1, wherein said upper bending mold is provided with a series of perforations connected to a hot air intake so that an air cushion is formed between the glass sheet and the upper bending mold.

8. Device according to claim 1, wherein said upper mold is comprised of refractory steel.

9. Device according to claim 1, wherein the suction box consists of a suction chamber and a skirt provided with dismantling means.

* * * * *